July 29, 1930.  T. SUZUKI ET AL  1,771,451
COLOR SCREENING GLASS
Filed Nov. 4, 1926
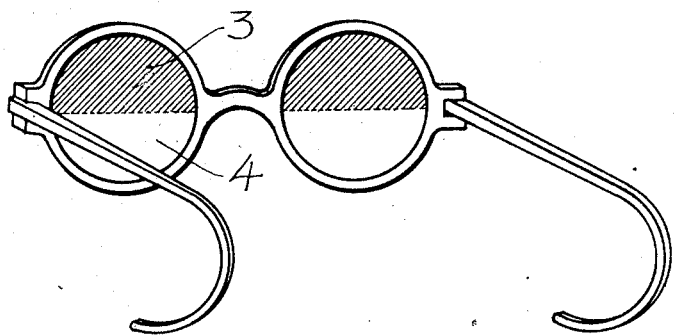
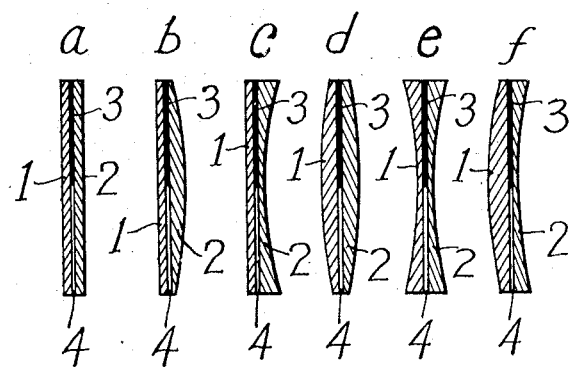
Inventors:
T. Suzuki & S. Sakurai
By Attorneys: Marks & Clerk.

Patented July 29, 1930

1,771,451

UNITED STATES PATENT OFFICE

TSUNEO SUZUKI AND SUEO SAKURAI, OF KOISHIKAWA-KU, TOKYO, JAPAN, ASSIGNORS TO ZAIDAN HOJIN RIKAGAKU KENKYUJO, OF TOKYO, JAPAN

COLOR-SCREENING GLASS

Application filed November 4, 1926, Serial No. 146,276, and in Japan June 15, 1926.

This invention relates to a color screening glass comprising two combined lenses each of which is plane at the facing side or the surface of combination, while plane, concave or convex at the other side, the facing or plane surface of one of the lenses is partly coated with transparent coating material dissolving dyestuff or dyestuffs which absorb or screen dizzy rays upon eyes and also dissolving dyestuff or dyestuffs which absorb or screen injurious rays upon eyes. The object of the invention is to obtain a color screening glass by which not only dizzy and injurious rays can be effectively absorbed or screened, but also a clear and pleasant sensation can be obtained.

In the accompanying drawings:

Fig. 1 shows a perspective view of a pair of glasses according to the invention, and Fig. 2, a, b, c, d, e and f show sections of six examples of lenses used for the glass according to the invention.

In the drawings, 1 and 2 are lenses which are coupled or combined in their respective plane surfaces. The other side of each of the lenses is any desired form of plane, convex, or concave. Thus, various forms of combination such as shown in a, b, c, d, e and f in Fig. 2 may be obtained. A part of the plane facing surface of one of the lenses, say of lens 1, is coated with transparent coating material dissolving dyestuff or dyestuffs which absorb or screen rays having dizzy effect upon eyes and also dissolving dyestuff or dyestuffs which absorb or screen injurious rays upon eyes. For example, gelatine, varnish, etc. may be used as the transparent coating material, and methyl violet or methylen blue and any other colors may be used as the dyestuffs for screening rays having dizzy effect such as search lights used in war, head lights of motor cars or strong flame in welding operation, etc., while ultrazin prepared by a process described in U. S. application Serial No. 731,488, filed August 11, 1924, now Patent No. 1,684,562 dated September 18, 1928 may be used to screen injurious rays such as ultraviolet ray. In the example shown, upper half 3 of the one of the facing surfaces is colored with such colored coating, while the rest or lower half 4 thereof is left without any treatment. Instead of leaving the lower part 4 untreated, it may be coated with transparent coating material of pleasant light color such as yellow. Of course, the colored part 3 and the uncolored or light colored part 4 may be reversed according to the purpose of users in cases.

In the known antiglare glass, the lenses are colored equally all over the surface with metallic compound (inorganic compound) rather in denser color to avoid the glare, and therefore there is a draw back that the sight given by such a glass is very dark all over the vision so that it is very inconvenient for night use, or for working with any flame or arc of glare.

In the improved glass of this invention, the lenses are partly colored by different colors denser and lighter, and therefore by a small movement of eye-ball, not only any dizzy and injurious rays from any object can be screened, but also clear and pleasant sight for other objects can be easily obtained at will, so that the improved glass can be efficiently used for chauffeurs, aerial-navigators, workmen in welding or smelting factories, mountaineers, skiers or skatemen or any other users who wish to escape from the detriments of dizzy and injurious rays.

Claims:

1. A color screening glass comprising two coupled or combined lenses each of which is plane in the facing or coupling surface, the upper half only of the plane or coupling surface of one of the lenses being coated with a transparent solvent containing ultrazin.

2. A color screening glass comprising two coupled or combined lenses each of which is plane in the facing or coupling surface, the upper half only of the plane or coupling surface of one of the lenses being coated with a transparent solvent containing one or more of dyestuffs which screen dizzy rays upon the eyes, and also ultrazin.

In testimony whereof we affix our signatures.

TSUNEO SUZUKI.
SUEO SAKURAI.